US008110110B2

United States Patent
Croue et al.

(10) Patent No.: US 8,110,110 B2
(45) Date of Patent: Feb. 7, 2012

(54) METHOD FOR REMOVING ORGANIC MATTER FROM WATER AND A DEVICE FOR CARRYING OUT SAID METHOD

(75) Inventors: Jean-Philippe Croue, Savigny L'Evescault (FR); Hugues Humbert, Claye Souilly (FR); Abdelkader Gaid, Paris (FR); Herve Suty, Champigny sur Marne (FR); Jean-Christophe Schrotter, Maisons Laffitte (FR); Yvan Poussade, Pontoise (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 474 days.

(21) Appl. No.: 12/096,500

(22) PCT Filed: Dec. 7, 2006

(86) PCT No.: PCT/FR2006/002671
§ 371 (c)(1),
(2), (4) Date: Jun. 6, 2008

(87) PCT Pub. No.: WO2007/066010
PCT Pub. Date: Jun. 14, 2007

(65) Prior Publication Data
US 2008/0290029 A1 Nov. 27, 2008

(30) Foreign Application Priority Data
Dec. 7, 2005 (FR) ...................................... 05 12433

(51) Int. Cl.
*C02F 1/52* (2006.01)

(52) U.S. Cl. ........ 210/638; 210/675; 210/705; 210/669; 210/670

(58) Field of Classification Search .................. 210/638, 210/675, 705, 669, 670; 209/169, 170
See application file for complete search history.

(56) References Cited

U.S. PATENT DOCUMENTS

| 3,095,391 | A | * | 6/1963 | Brockway et al. | 527/312 |
|---|---|---|---|---|---|
| 3,762,559 | A | * | 10/1973 | Knoy et al. | 210/293 |
| 4,039,444 | A | * | 8/1977 | Bory et al. | 210/679 |
| 4,154,675 | A | | 5/1979 | Jowett et al. | |
| 4,948,814 | A | * | 8/1990 | Motozato et al. | 521/30 |
| 6,669,849 | B1 | | 12/2003 | Nguyen et al. | |
| 6,890,431 | B1 | * | 5/2005 | Eades et al. | 210/195.1 |
| 2005/0236335 | A1 | | 10/2005 | Karaman | |

FOREIGN PATENT DOCUMENTS

| FR | 2612801 | 3/1987 |
|---|---|---|
| FR | 2872063 | 6/2004 |
| FR | 2872064 | 6/2004 |
| JP | 07008972 | 1/1995 |

OTHER PUBLICATIONS

Nash, Robert A., Pharmaceutical Development and Technology, 2(2), 185-186 (1997).*

* cited by examiner

*Primary Examiner* — Nam Nguyen
*Assistant Examiner* — Denise R Anderson
(74) *Attorney, Agent, or Firm* — Coats & Bennett, P.L.L.C.

(57) ABSTRACT

A system and method is provided for removing organic matter from water. The method includes contacting the water with a powdered material with an anionic or cationic surface charge and having a particle size of between 0.1 mm and 2 mm. The powdered material is a modified product of natural origin. The system and method also provides for the regeneration of the powdered material in situ and reused.

30 Claims, 2 Drawing Sheets

METHOD FOR REMOVING ORGANIC MATTER FROM WATER AND A DEVICE FOR CARRYING OUT SAID METHOD

This application is a U.S. National Stage Application of PCT Application No. PCT/FR2006/002671, with an international filing date of Dec. 7, 2006. Applicant claims priority based on French Application Serial No. 0512433 filed Dec. 7, 2005.

The invention relates to a method for removing organic matter and/or micropollutants from water, and also to a device for carrying out said method.

Numerous treatment systems exist for pure and ultrapure water, which use the succession of a treatment on adsorbent material followed by a refining treatment on ion exchange resins. The ion exchange resins are mainly used for refining, and therefore at the end of the system.

For example, U.S. Pat. No. 6,475,386 describes a method for treating drinking water using the resin and the adsorbent for purifying a pretreated water, in a single reactor. This method does not apply to raw water, and no system for regenerating the filter is provided for.

Application WO 96/07615 describes a method for treating water with ion exchange resins, these resins being separated from the water before the water undergoes another treatment, such as an adsorption. This method requires the use of an on-line separating device for separating the resin during the course of treatment.

U.S. Pat. No. 6,669,849 describes a method for removing dissolved organic carbon from water, which uses an ion exchange resin in disperse form with a particle size of less than 100 µm. The dispersion is carried out by mechanical agitation, by means of mixing pumps or gas agitation (column 2, lines 2-13).

U.S. Pat. No. 4,154,675 describes a method for removing dissolved material from liquid medium which uses an ion exchange material based on cellulose in particulate form, with agitation. In this method, the regeneration is carried out by dissolution and then reprecipitation of the cellulose (column 6, lines 38-44).

The abstract of application JP 07 008972 (Patent Abstracts of Japan, vol. 1995, No. 04, 1995-05-31) describes a method of adsorption or of removal of a dye/pigment from wastewater by adsorption on a starch optionally modified with anionic or cationic groups, with agitation. This method is not used on an industrial scale. Furthermore, the content of organic matter giving color to an effluent is significantly greater than that of a dissolved organic matter, in particular in drinking water, and the residual values targeted after treatment are significantly lower in the case of a drinking water, which makes treatment much more difficult.

There therefore exists a need for a method for treating water in order to remove the natural or synthetic organic matter and/or the natural or synthetic micropollutants (for example, pesticides) from the water, which can be carried out continuously, with optional regeneration of the treatment system without stopping the system, and which can be applied to any type of water.

The term "water" is intended to mean both raw water and pretreated water, alternatively an effluent, i.e. water or wastewater originating from a closed chamber such as a treatment station, in particular drinking water, or else originating from an industrial complex or from a purifying pond.

The expression "removing natural or synthetic organic matter and/or natural or synthetic micropollutants" is intended to mean a significant reduction in the content of natural or synthetic organic matter and/or of natural or synthetic micropollutants compared with the untreated water, without it being necessary for this removal to be complete.

It has now been found that the use of a powdered material with an anionic or cationic surface charge, having a particle size of between 0.1 µm and 2 µm, makes it possible to achieve this objective.

Figure 1:
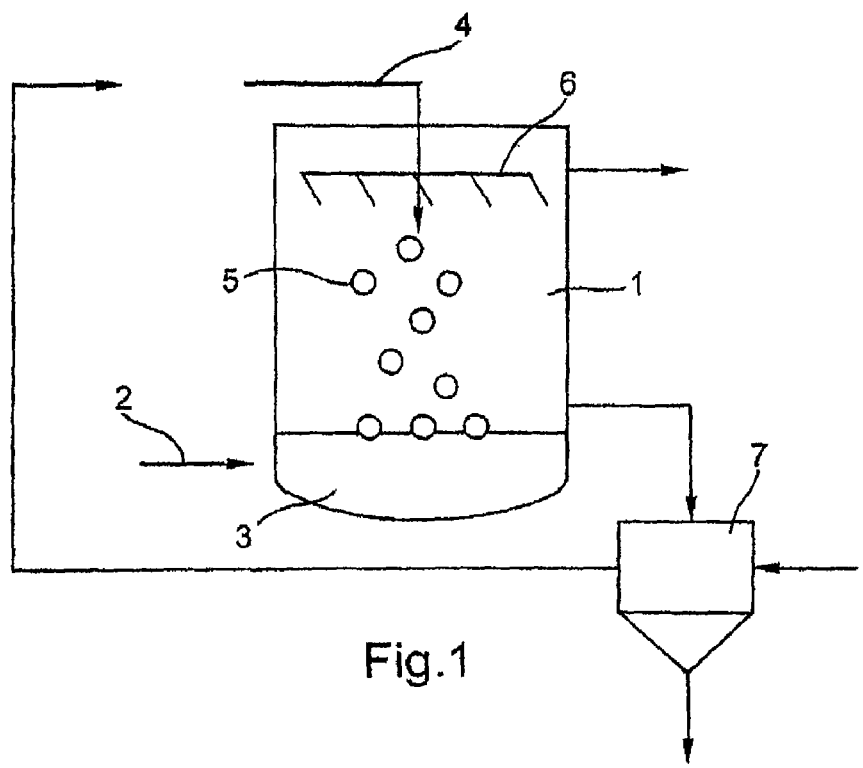
FIG. 1 is a schematic illustration of one embodiment of the present invention operating in a fluidized bed mode and including an ascending-flow reactor.

According to a first aspect, the subject of the invention is therefore a method for removing natural or synthetic organic matter from water, in which said water to be treated is brought into contact with a powdered material with an anionic or cationic surface charge, having a particle size of between 0.1 µm and 2 mm, preferably between 15 µm and 150 µm, in which said powdered material with an anionic or cationic surface charge is a modified product of natural origin and in which said material is regenerated in situ without being solubilized, and re-used.

The water to be treated may, for example, be raw water, pretreated water, drinking water or an effluent.

An advantageous use of the method is the removal of the natural or synthetic organic matter from water, and in particular of the dissolved organic matter.

The term "modified product of natural origin" is intended to mean a product of natural origin that has undergone at least one chemical modification capable of conferring on it functional groups and/or physicochemical properties different from that or those that it possessed in its native form.

Advantageously, said material that can be used in the method according to the invention is selected from a modified plant gum and modified starch, and mixtures thereof.

Said plant gum, before modification, can be selected from glucomannans such as konjac, xyloglucans such as tamarind gum, galactomannans such as guar, carob, tara, fenugreek or "mesquite" gum (also called prosopis), or gum Arabic, and mixtures thereof. Preferably, galactomannans, in particular guars, will be used.

As product of natural origin, before modification, use may also be made of starch, for example wheat starch, potato starch, corn starch, sweet potato starch, tapioca starch, cassava starch, sago starch or rice starch.

Said starch may optionally be subjected to a pregelatinization treatment, for instance cooking with hot water or steam.

Advantageously, said modified plant gum or said modified starch can comprise one or more cationic or cationizable groups.

The cationic or cationizable groups of the modified product of natural origin are, for example, selected from quaternary ammoniums, tertiary amines, pyridiniums, guanidiums, phosphoniums and sulfoniums.

Said cationic or cationizable groups can, for example, be introduced by means of a nucleophilic substitution reaction.

Alternatively, the introduction of cationic or cationizable groups into the product of natural origin, in particular a plant gum or a starch, can be carried out by means of an esterification with amino acids, such as, for example, glycine, lysine, arginine or 6-aminocaproic acid, or with quaternized amino acid derivatives such as, for example, betaine hydrochloride.

According to another embodiment, the introduction of cationic or cationizable groups is carried out by means of a radical polymerization comprising the grafting of monomers comprising at least one cationic or cationizable group the product of natural origin, plant gum or starch.

Preferably, the cationic or cationizable groups are associated with negatively charged counterions selected from chloride, bromine, iodide, fluoride, sulfate, methyl sulfate, phosphate, hydrogen phosphate, phosphonate, carbonate, hydrogen carbonate and hydroxide ions.

According to another preferred aspect of the method according to the invention, said product of natural origin is selected from modified starch and a modified plant gum, said modified starch and said plant gum comprising respectively one or more anionic or anionizable groups.

The anionic or anionizable groups are, for example, selected from carboxylate, sulfate, sulfonate, phosphate and phosphonate groups.

The introduction of anionic or anionizable groups can be carried out, for example, by reacting the product of natural origin, in particular a plant gum or a starch, with an anionizing agent such as propane saltone, butane saltone, monochloroacetic acid, chlorosulfonic acid, maleic acid anhydride, succinic acid anhydride, citric acid, sulfates, sulfonates, phosphates, phosphonates, orthophosphates, polyphosphates or metaphosphates, and the like.

According to an advantageous aspect of the method according to the invention, said product of natural origin, in particular a plant gum or a starch, is modified so as to render it water-insoluble.

To this effect, it is possible to carry out a chemical crosslinking of said product of natural origin, or else to chemically or physically adsorb it onto a water-insoluble inorganic or organic support, or alternatively to make use of its natural crystallinity.

The chemical crosslinking can be carried out, for example, through the action of a crosslinking agent selected from formaldehyde, glyoxal, halohydrins such as epichlorohydrin or epibromohydrin, phosphorus oxychloride, polyphosphates, diisocyanates, bis(ethyleneurea), polyacids such as adipic acid or citric acid, acroleine, and the like, or through the action of a metallic complexing agent such as, for example, zirconium(IV), or else under the effect of an ionizing radiation.

Advantageously, said product of natural origin, in particular a plant gum or a starch, which is modified and/or optionally insoluble, is mixed with agents for trapping natural organic substances, such as active carbon or cationic celluloses.

Said product of natural origin, which is modified and/or optionally insoluble, can also be mixed with inert fillers such as sand or polymer powder.

The method for removing natural or synthetic organic matter from water according to the invention can also comprise at least one step of separating the treated effluent, after the water to be treated has been brought into contact with said material.

This separation can be carried out, for example, using a filter, a grid, a semipermeable membrane, a settling tank, a strainer, a perforated top or a hydrocyclone.

Advantageously, in the method according to the invention, the powdered material with an anionic or cationic surface charge is regenerated in situ and re-used, thereby allowing the method according to the invention to be carried out continuously.

The in situ regeneration of said powdered material with an anionic or cationic surface charge, which is partially or completely saturated with organic matter, without solubilization, can, for example, be carried out in the following way:

said material is extracted continuously or sequentially from the flow of water to be treated, said material is brought into contact, in a reactor, with a suitable regenerating solution, which may, for example, be a caustic solution or a saline brine, optionally heated to a desired temperature, and said regenerated material is rinsed and reinjected into the flow of water to be treated.

According to a preferred aspect, the powdered material with an anionic or cationic surface charge is floating or placed in a fluidized bed.

The expression "floating or placed in a fluidized bed" is intended to mean that the powdered material with an anionic or cationic surface charge floats due to its lower density or under the action of an ascending flow or of a gas, without being subjected to a mechanical force.

Advantageously, the fact that said material is floating or placed in a fluidized bed makes it possible to have a greater apparent exchange surface and therefore a higher reaction rate, which makes it possible to have a shorter contact time for the removal of the organic matter from the water.

According to a first preferred variant of the method according to the invention, the latter comprises the steps consisting in:

feeding the lower part of at least one ascending-flow reactor, containing said powdered material with an anionic or cationic surface charge, with water to be treated, said reactor comprising at its lower part a distributing floor and at its upper part a floor or a grid, and collecting the effluent treated at the upper part of the reactor.

A second variant of the method comprises the steps consisting in:

feeding the lower part of at least one 2-compartment reactor, wherein one of the compartments is an ascending-flow compartment and the other a descending-flow compartment, containing said powdered material with an anionic or cationic surface charge, with water to be treated, said reactor comprising at its lower part a distributing floor and at its upper part a floor or a grid, and collecting the treated effluent at the upper part of the reactor.

Advantageously, said material is floating. Preferably, said powdered material with an anionic or cationic surface charge is collected at the upper part of the reactor.

According to a subsequent aspect, the invention also relates to a device for carrying out the method as described above, comprising at least one reactor, means for feeding a powdered material with an anionic or cationic surface charge into said reactor(s), means for feeding the water to be treated into said reactor(s), means for separating the treated effluent and means for collecting the treated effluent.

Said device can also comprise means for collecting and regenerating the powdered material with an anionic or cationic surface charge after treatment of the water.

Figure 2:
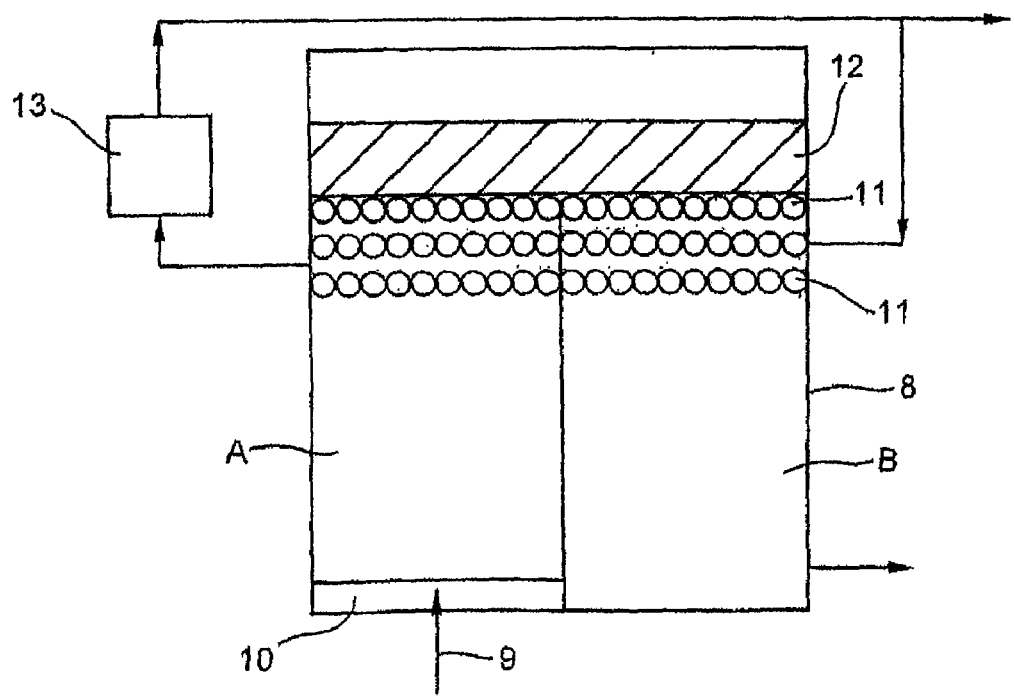
FIG. 2 is a schematic illustration of one embodiment of the present invention operating in a flotation mode including a two-compartment reactor.
Figure 3:
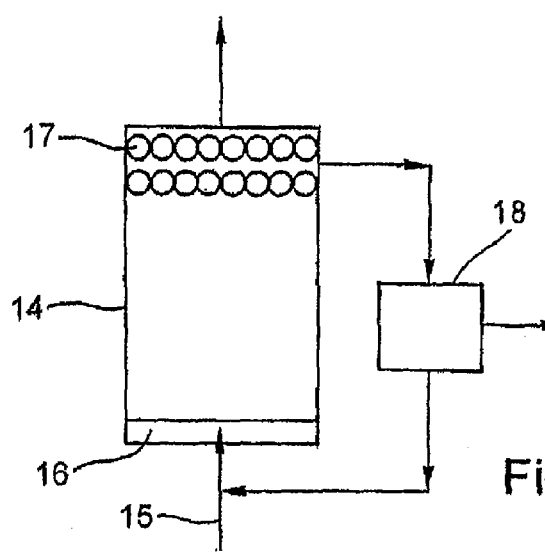
FIG. 3 is a schematic illustration of one embodiment of the present invention operating in a flotation mode including an ascending-flow reactor.

Exemplary embodiments of such a device are represented schematically in FIGS. 1, 2 and 3 by way of nonlimiting illustrations.

FIG. 1 represents a device that operates in fluidized bed mode, comprising an ascending-flow reactor (1) equipped:

in its lower part, with means for feeding with water to be treated (2) via a distributing floor (3);

in its upper part, means for feeding (4) with powdered material with an anionic or cationic surface charge (5) and thin plates (6), the treated effluent being recovered at the upper part of the reactor.

A downstream separation system (7) makes it possible to regenerate and recycle the powdered material with an anionic or cationic surface charge.

FIG. 2 represents a device that functions in flotation mode, comprising a two-compartment reactor (8), i.e. an ascending-flow compartment (A) equipped in its lower part with means for feeding (9) with water to be treated via a distributing floor (10) and a descending-flow compartment (B); said reactor comprising in its upper part a floating powdered material with an anionic or cationic surface charge (11) and a top (12), the treated effluent being collected at the lower part of the reactor.

An upstream separation system (13) makes it possible to regenerate and recycle the powdered material with an anionic or cationic surface charge.

FIG. 3 represents a device that operates in flotation mode, comprising an ascending-flow reactor (14) equipped in its lower part with means for feeding with water to be treated (15) via a distributing floor (16); said reactor comprising in its upper part a floating powdered material with an anionic or cationic surface charge (17), the treated effluent being collected at the upper part of the reactor.

A separation system (18) makes it possible to regenerate and recycle the powdered material with an anionic or cationic surface charge.

According to another of its aspects, the invention relates to a method for removing natural or synthetic organic matter from water, in which said water to be treated is brought into contact with a powdered material with an anionic or cationic surface charge, having a particle size of between 0.1 µm and 2 mm, preferably between 15 µm and 150 µm, also comprising at least one subsequent step of purifying the treated effluent originating from the water brought into contact with said powdered material with an anionic or cationic surface charge.

This purification step makes it possible to remove micropollutants and/or residual constituents of the organic matter. Preferably, this purification treatment is carried out by adsorption onto an adsorbent material.

According to this aspect of the invention, any type of powdered material with an anionic or cationic surface charge can be used, irrespective of whether or not it is of natural origin.

In particular, a modified powdered material with an anionic or cationic surface charge, of natural origin, as defined above, or else anionic or cationic, styrene-based or acrylic-based synthetic resins, can be used.

According to this aspect of the invention, the method according to the invention makes it possible, after removal of the natural or synthetic organic matter from the water by bringing into contact with the powdered material with an anionic or cationic surface charge as described above, to remove natural or synthetic micropollutants present in the treated effluent, for instance pesticides, and/or residual constituents of the organic matter which are still present in the treated effluent.

This is because the previously removed organic matter, if it was still present, would compete unfavorably with the micropollutants.

Moreover, the subsequent purification step makes it possible to eliminate a wider range of organic molecules.

This subsequent purification step can in particular be carried out following the steps of feeding with water to be treated and of collecting the treated effluent, mentioned above as preferred variants of the method according to the invention.

Use will, for example, be made of an adsorbent material of crosslinked and functionalized solid type, for instance activated silica, modified silica, activated alumina or modified or unmodified products of natural origin, as described above, or else powdered active carbon, iron hydroxide (also known as GFH for "granular ferric hydroxide") or natural zeolite, said adsorbent material having a particle size of between 0.1 µm and 2 mm.

Advantageously, after the effluent has been brought into contact with said adsorbent material, the purified effluent is subjected to at least one separation step, which can be carried out, for example, using a filter, a settling tank, a hydrocyclone or a flotation separator.

After recovery of the treated effluent, the adsorbent material can be regenerated in situ and re-used, which makes it possible for the method as a whole to be carried out continuously.

According to this aspect of the invention, the method according to the invention comprises the steps consisting in:
    placing said water to be treated together with a powdered material with an anionic or cationic surface charge, having a particle size of between 0.1 µm and 2 mm,
    subjecting the treated effluent to at least one separation step,
    feeding at least one ascending-flow reactor, containing an adsorbent material as defined above, with said treated effluent, said reactor comprising at its lower part a distributing floor and at its upper part a floor or a grid, and
    collecting the purified effluent after this subsequent purification treatment.

According to another advantageous variant, the method according to the invention comprises the steps consisting in:
    placing said water to be treated together with a powdered material with an anionic or cationic surface charge, having a particle size of between 0.1 µm and 2 mm,
    subjecting the treated effluent to at least one separation step,
    feeding at least one 2-compartment reactor, wherein one of the compartments is an ascending-flow compartment and the other is a descending-flow compartment, containing an adsorbent material as defined above, with said treated effluent, said reactor comprising at its lower part a distributing floor and at its upper part a floor or a grid, and
    collecting the purified effluent after this subsequent purification treatment.

The step of separating the treated effluent, before the subsequent purification step, can, for example, be carried out using a filter, a grid, a semipermeable membrane, a settling tank, a strainer, a perforated top or a hydrocyclone.

According to a subsequent aspect, the invention also relates to a device for carrying out the method as described above, comprising at least one reactor, means for feeding a powdered material with an anionic or cationic surface charge into said reactor(s), means for feeding the water to be treated into said reactor(s), means for separating the treated effluent and means for collecting the treated effluent, means for feeding the treated effluent into at least one reactor, means for feeding an adsorbent material as defined above into said reactor(s), means for separating the purified effluent and means for collecting said effluent.

The device can also comprise means for collecting and regenerating the adsorbent material after treatment of the treated effluent.

The invention is illustrated in a nonlimiting manner by the example below.

EXAMPLE 1

Treatment to Remove Natural Organic Matter and Pesticides

In this study, a comparison was made of variants of the method according to the invention comprising either bringing the water to be treated into contact with the powdered material with a cationic surface charge, or bringing the water into contact with a powdered material with a cationic surface charge followed by treatment on active carbon with, on the one hand, a simple treatment with active carbon and, on the other hand, a simultaneous treatment with the two reagents (powdered material with a cationic surface charge and active carbon).

Batch trials were carried out in a closed reactor (600 ml beakers) on volumes of raw underground water (drinking water treatment plant in Villejean/Rennes, France) doped with pesticides (atrazine (280 µg/l)+isoproturon (310 µg/l)) of 500 ml, stirred using a magnetic bar at 300 rpm, into which the powdered material with a cationic surface charge and/or the active carbon were introduced. The samples (25 ml) were taken using a 50 ml syringe for various contact times, and then systematically filtered through GF syringe filters (Minisart, Sartorius) and placed in glass flasks before analysis (pesticides, COD, UV254).

The adsorption isotherms were obtained by bringing increasing doses of active carbon into contact with 500 ml of the water to be studied in glass flasks. A control flask without adsorbent made it possible to verify the absence of adsorption of the pesticides due to the flask. The flasks were stirred by means of a rotary shaker (20 oscillations per minute) at ambient temperature (20-25° C.). After a 24 h period of shaking, the concentration of the solute in the aqueous phase was analyzed after separation of the liquid and solid phases (GFC filters). Preliminary trials made it possible to verify that, for a contact time of 24 h, a state of pseudoequilibrium of pesticide adsorption was reached.

The pesticide analyses were carried out by liquid chromatography (HPLC) on a 5 µm spherical $C_{18}$ Waters Resolve column (flow rate: 0.7 ml/min, eluting phase: 50% water/50% methanol (v/v)). The detection was carried out with a Waters 486 detector at a wavelength of 233 nm (optical wavelength for the simultaneous detection of atrazine and isoproturon for concentrations of between 5 and 200 µg/l.

The adsorption kinetics of the active carbon Picazine HP 15-35 are used in the following configurations:
a) alone (powdered active carbon (PAC), 40 mg/l);
b) sequentially coupled to a powdered material with a cationic surface, based on modified starch, hereinafter referred to as AM (AM, 400 mg/l then PAC, 40 mg/l). The AM material is a cold-soluble starch which was crosslinked with epibromohydrin and then cationized with 2,3-epoxypropyltrimethylammonium chloride. The degree of cationic substitution of the AM material is 0.51.

This coupling consists of a pretreatment of the water with the AM material (30 min), then an intermediate filtration in order to separate the water from the AM material, and a final treatment of the water with the active carbon (30 min);
c) simultaneously coupled with the AM material (PAC, 40 mg/l+AM, 400 mg/l).

Figure 4:
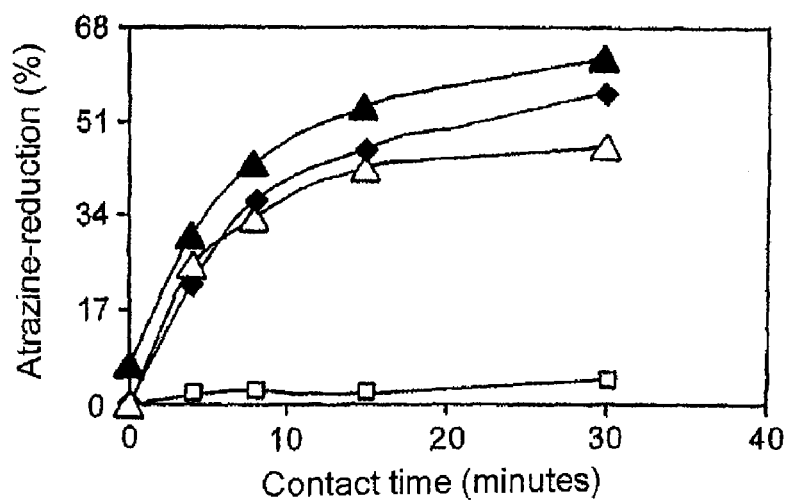
FIG. 4 is a graph illustrating the percentage reduction in atrazine as a function of contact time with adsorbent material.
Figure 5:
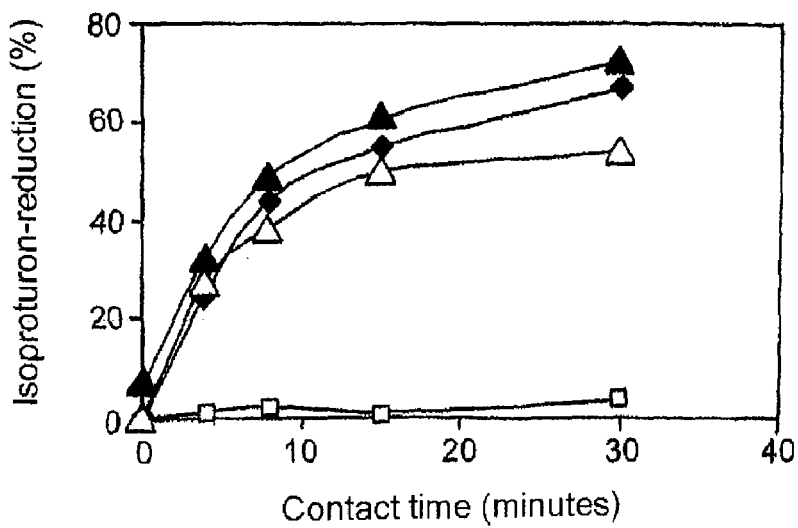
FIG. 5 is a graph illustrating the percentage reduction in isoproturn as a function of contact time with adsorbent material.

The results are given in FIGS. 4 and 5.

The curves of FIGS. 4 and 5 represent, respectively, the percentage reduction in atrazine and isoproturon as a function of the contact time with the adsorbent material.

The following symbols are used:
♦—for the active carbon (PAC) alone;
□—for the AM material alone;
▲—for the sequential treatment (AM material then PAC);
Δ—for the simultaneous treatment with the AM material and the PAC.

The results show that the modified starch-based AM material alone is not effective in producing a reduction in the pesticides (atrazine and isoproturon), since the latter are uncharged molecules and therefore cannot adsorb onto the powdered materials with a surface charge.

The PAC alone makes it possible to obtain a good reduction in pesticide. However, its capacity is limited by competition phenomena between the organic matter and the pesticides with respect to the adsorption sites of the active carbon.

The simultaneous treatment with PAC+AM gives results that are not as good as the treatment with PAC alone, due to the absorption of the modified starch-based AM material onto the PAC.

The sequential treatment with the modified starch-based AM material and then with the PAC, according to one of the variants of the method according to the invention, makes it possible to obtain the best reduction in the pesticides. This is because, in the first step, the modified starch-based AM material absorbs the dissolved organic matter, leaving the entire capacity of the PAC to adsorb the pesticides in the second step.

The performance levels of the various treatments, expressed as amount of dissolved organic carbon present in the effluent, are given in table 1 below.

TABLE 1

| Treatment type | Dissolved organic carbon (mg/l) |
|---|---|
| Raw water | 6.25 |
| PAC (40 mg/l) | 5.60 |
| AM alone (400 mg/l) | 2.60 |
| AM (400 mg/l) then PAC (40 mg/l) | 2.35 |

The results show that the treatment with the modified starch-based AM material alone, according to an alternative of the method according to the invention, makes it possible to significantly decrease the content of dissolved organic carbon in the effluent.

The sequential treatment with the modified starch-based AM material alone and then with AC, according to another alternative of the method according to the invention, gives the best results for reduction in the content of dissolved organic carbon in the effluent.

The invention claimed is:

1. A method for removing natural or synthetic organic matter from water comprising: contacting water to be treated with a powdered material with an anionic or cationic surface charge to form a treated effluent, having a particle size of between 0.1 µm and 2 mm, said powdered material with an anionic or cationic surface charge being a modified product of natural origin, wherein said material is floating or contained in a fluidized bed due to said material having a density lower than the density of water or due to the action of an ascending flow of gas without said material being subjected to a mechanical force, and subsequently purifying the treated effluent originating from the water brought into contact with said material.

2. The method of claim 1, wherein said purification treatment is carried out by adsorption onto an adsorbent material.

3. The method of claim 1, wherein said adsorbent material is of crosslinked and functionalized solid type having a particle size of between 0.1 μm and 2 mm.

4. The method of claim 1, wherein after the treated effluent has been brought into contact with said adsorbent material, the purified effluent is subjected to at least one separation step.

5. The method of claim 4, wherein the separation is carried out using a filter, a grid, a semipermeable membrane, a settling tank, a strainer, a perforated top, a hydrocyclone or a flotation separator.

6. The method of claim 1 wherein the adsorbent material is regenerated in situ and re-used.

7. The method of claim 1 wherein the method is carried out continuously.

8. The method of claim 1 further comprising:
feeding a lower part of at least one ascending-flow reactor, containing said powdered material with an anionic or cationic surface charge, with water to be treated, said reactor comprising at the lower part a distributing floor and at an upper part a floor or a grid, and
collecting the treated effluent at the upper part of the reactor.

9. The method of claim 1, further comprising:
feeding a lower part of at least one 2-compartment reactor, wherein one of the compartments is an ascending-flow compartment and the other is a descending-flow compartment, containing said powdered material with an anionic or cationic surface charge, with water to be treated, said reactor comprising at the lower part a distributing floor and at an upper part a floor or a grid, and
collecting the treated effluent at the upper part of the reactor.

10. The method of claim 8, wherein said material is floating.

11. The method claim 8, wherein said material is collected at the lower part of the reactor.

12. The method of claim 8 further comprising:
feeding at least one ascending-flow reactor, containing an adsorbent material, with said treated effluent, said reactor comprising at the lower part a distributing floor and at an upper part a floor or a grid, and
collecting the purified effluent after a subsequent purification treatment.

13. The method of claim 8 further comprising:
feeding at least one 2-compartment reactor, wherein one of the compartments is an ascending-flow compartment, and the other is a descending-flow compartment, containing an adsorbent material, with said treated effluent, said reactor comprising at the lower part a distributing floor and at the upper part a floor or a grid, and
collecting the purified effluent after a subsequent purification treatment.

14. The method according to claim 1, further comprising:
contacting said water to be treated with said powdered material with an anionic or cationic surface charge, having a particle size of between 0.1 μm and 2 mm,
subjecting the treated effluent to at least one separation step,
feeding at least one ascending-flow reactor, containing an adsorbent material, with said treated effluent, said reactor comprising a lower part having a distributing floor and an upper part having a floor or a grid, and
collecting the purified effluent after the subsequent purification treatment.

15. The method of claim 1, further comprising:
contacting said water to be treated with said powdered material with an anionic or cationic surface charge, having a particle size of between 0.1 μm and 2 mm,
subjecting the treated effluent to at least one separation step,
feeding at least one 2-compartment reactor, wherein one of the compartments is an ascending-flow compartment and the other is a descending-flow compartment, containing an adsorbent material, with said treated effluent, said reactor comprising at a lower part a distributing floor and at an upper part a floor or a grid, and
collecting the purified effluent after the subsequent purification treatment.

16. The method of claim 14 wherein the feeding with water to be treated and the collecting of the treated effluent, before purification, comprises:
feeding the lower part of at least one ascending-flow reactor, containing said powdered material with an anionic or cationic surface charge, with water to be treated, said reactor comprising at the lower part a distributing floor and at the upper part a floor or a grid, and
collecting the treated effluent at the upper part of the reactor.

17. The method of claim 14 wherein feeding the water to be treated and the collecting of the treated effluent, before purification, comprises:
feeding the lower part of at least one 2-compartment reactor, wherein one of the compartments is an ascending flow compartment and the other is a descending-flow compartment, containing said powdered material with an anionic or cationic surface charge, with water to be treated, said reactor comprising at the lower part a distributing floor and at the upper part a floor or a grid, and
collecting the treated effluent at the upper part of the reactor.

18. The method of claim 1, wherein the particle size is between 15 μm and 150 μm.

19. The method of claim 1, wherein said water is raw water, pretreated water, drinking water or an effluent.

20. The method of claim 1, wherein said modified product of natural origin is selected from a modified plant gum and modified starch, and mixtures thereof.

21. The method of claim 1, wherein said product of natural origin before modification is starch selected from wheat starch, potato starch, corn starch, sweet potato starch, tapioca starch, cassava starch, sago starch or rice starch.

22. The method of claim 1, wherein said modified product of natural origin is starch which has undergone a pregelatinization pretreatment.

23. The method of claim 1, wherein said product of natural origin before modification is a plant gum selected from glucomannans, xyloglucans and galactomannans, and mixtures thereof.

24. The method of claim 1, wherein said product of natural origin is selected from modified starch and a modified plant gum, said modified starch and said modified plant gum comprising respectively one or more cationic or cationizable groups.

25. The method of claim 1, wherein the cationic or cationizable groups are selected from quaternary ammoniums, tertiary amines, pyridiniums, guanidiniums, phosphoniums and sulfoniums.

26. The method of claim 1, wherein the cationic or cationizable groups are associated with negatively charged counterions selected from chloride, bromide, iodide, fluoride, sulfate, methyl sulfate, phosphate, hydrogen phosphate, phosphonate, carbonate, hydrogen carbonate and hydroxide ions.

27. The method of claim 1 wherein said product of natural origin is selected from modified starch and a modified plant gum, said modified starch and said modified plant gum comprising respectively one or more anionic or anionizable groups.

28. The method of claim 27, wherein the anionic or anionizable groups are selected from carboxylate, sulfate, sulfonate, phosphate and phosphonate groups.

29. The method of claim 1, wherein said product of natural origin is modified so as to render it water-insoluble.

30. The process of claim 1, wherein said purifying step is a step of removing natural or synthetic micropollutants and/or residual constituents of the organic matter.

* * * * *